United States Patent [19]

Ogura

[11] Patent Number: 4,863,551

[45] Date of Patent: Sep. 5, 1989

[54] MARKING APPARATUS

[75] Inventor: Toyosaku Ogura, Kurobe, Japan

[73] Assignee: Yoshido Kogyo K.K., Tokyo, Japan

[21] Appl. No.: 228,540

[22] Filed: Aug. 5, 1988

[30] Foreign Application Priority Data

Aug. 10, 1987 [JP] Japan .......................... 62-122400[U]

[51] Int. Cl.[4] ............................................ B32B 31/18

[52] U.S. Cl. ...................................... 156/378; 156/64; 156/261; 156/518; 156/519; 156/530; 73/865.9

[58] Field of Search ............... 156/261, 518, 519, 530, 156/64, 378, 379; 73/865.9

[56] References Cited

U.S. PATENT DOCUMENTS

| | | | |
|---|---|---|---|
| 1,909,841 | 5/1933 | Perryman | 156/518 |
| 1,986,611 | 1/1935 | Thomsen | 156/518 |
| 3,031,369 | 4/1962 | Stephenson | 156/530 |
| 3,585,095 | 6/1971 | Shearhod | 156/261 |
| 4,214,944 | 7/1980 | Lemke | 156/518 |
| 4,619,141 | 10/1986 | Yoshieda et al. | 73/865.9 |

FOREIGN PATENT DOCUMENTS

| | | |
|---|---|---|
| 0171744 | 2/1986 | European Pat. Off. . |
| 3126450 | 1/1983 | Fed. Rep. of Germany . |
| 405107 | 12/1909 | France . |
| 2910646 | 6/1946 | France . |
| 426705 | 12/1965 | France . |
| 2479775 | 10/1981 | France . |
| 2519039 | 7/1983 | France . |
| 6194606 | 5/1986 | Japan . |
| 2015074 | 9/1979 | United Kingdom . |
| 2114622 | 12/1985 | United Kingdom . |

*Primary Examiner*—Caleb Weston

*Attorney, Agent, or Firm*—Hill, Van Santen, Steadman & Simpsom

[57] ABSTRACT

A marking apparatus is disclosed for cutting a piece out of an adhesive tape and simultaneously attaching the same onto and individual slide fastener which has been found defective during the travel of a continuous slide fastener chain. The apparatus is operatively associated with a detecting device which controls the operation of an air cylinder so that a cutting punch is reciprocated toward and away from an anvil and a support mandrel.

5 Claims, 5 Drawing Sheets

MARKING APPARATUS

BACKGROUND OF THE INVENTION

1. Field of the Invention

This invention relates to a marking apparatus for identifying a slide fastener chain when found defective during the course of its manufacture.

2. Prior Art

There have hitherto been proposed apparatus and instruments for inspecting a continuous slide fastener chain for any physical defects to be corrected before shipment as a complete slide fastener product. One such apparatus is disclosed in Japanese Laid-Open Patent Publication No. 61-94606 in which assembled slide fasteners are hung against an inspection panel and checked by observation with the human eyes to be sorted out if found defective anywhere, and in which a gilted tape is used to show the joints of adjacent slide fastener chains.

The visual inspection of fastener products as in the above prior art must eventually be followed up by an additional more fine inspection to ensure freedom of defects or off-specification finishes of the final product because of possible inadvertent oversights by fatigued or inexperienced working personnel. This problem is pronounced where the job attendant is required to check errors in small parts such as fastener coupling elements. Not only is such a conventional human performance time-consuming but it is not wholly reliable for its results.

SUMMARY OF THE INVENTION

It is therefore the primary object of the present invention to eliminate the foregoing difficulties and drawbacks of the prior art.

A more specific object of the invention is to provide an apparatus for marking a slide fastener chain when found defective which is simple in construction and highly reliable in operation, the apparatus being operatively associated with an automatic defect detecting device.

Another specific object of the invention is to provide a marking apparatus capable of applying an indicia removably to a selected area on defective slide fastener chain without impairing the latter.

A further specific object of the invention is to provide a marking apparatus capable of punching out and simultaneously applying an indicia to defective slide fastener chain in response to a control signal from an automatic defect detecting device.

According to the invention, there is provided a marking apparatus for identifying defective slide fasteners in a continuous fastener chain which comprises: a cutting punch having a blade and pneumatically actuated to vertically reciprocate to and from an operative position; a cutting anvil having a bore for receiving said blade; a support mandrel located under and in alignment with said cutting punch; and a plurality of guide rolls for guiding an adhesive tape between a supply reel and a take-up reel, characterized in that said cutting punch cuts a piece out of said adhesive tape and simultaneously transfers the same onto said fastener chain in a single one-way stroke.

The above and other objects and advantages of the present invention will be better understood from the following detailed description taken in connection with the accompanying drawings in which like reference numerals refer to like or corresponding parts throughout the several views.

DETAILED DESCRIPTION

Figure 1:
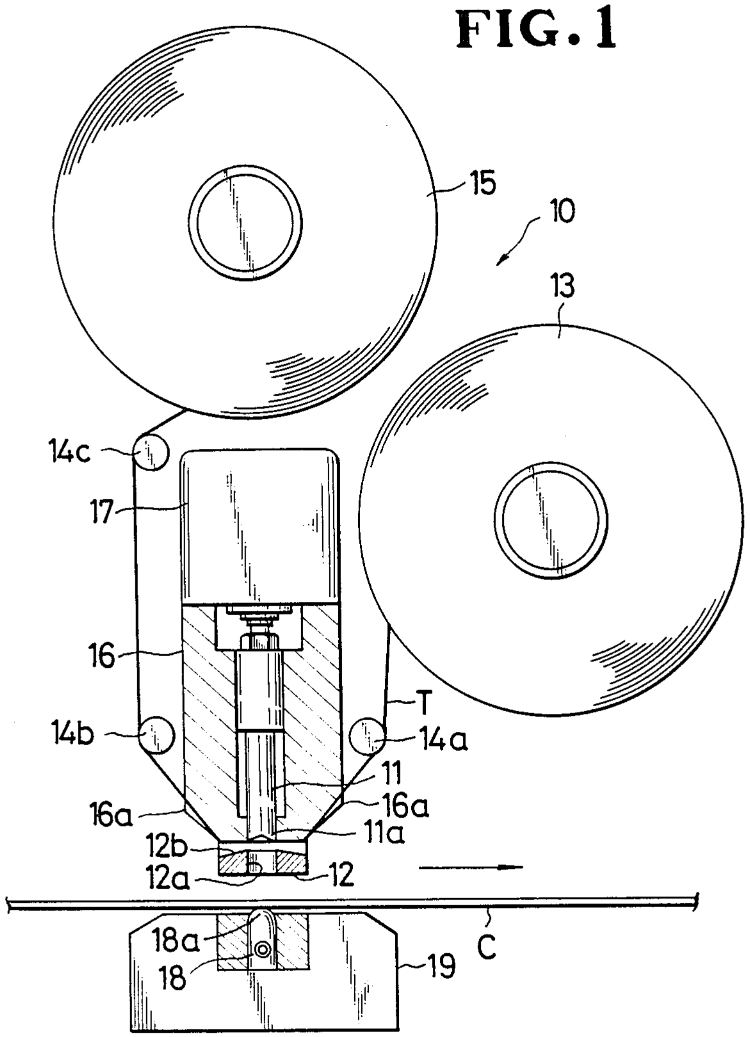
FIG. 1 is a front elevational, partly sectional, view of a marking apparatus embodying the invention.
Figure 2:
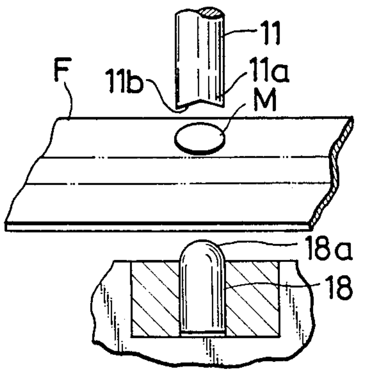
FIG. 2 is a perspective view of part of the apparatus, showing an indicia attached to a slide fastener tape.

Referring now to the drawings and FIG. 2 in particular, there is shown a marking apparatus 10 embodying the invention which comprises a vertically reciprocative cutting punch 11 and a stationary cutting anvil 12 coacting therewith in cutting an indicia M out of an elongate strip of adhesive tape T. The adhesive tape T is formed for example from a resinous substrate coated with suitable particulate metal, and it is fed from a supply reel 13 past guide rolls 14*a*, 14*b* and 14*c* and taken up on a take-up roll 15 mounted slightly above the supply reel 13.

Designated at 16 is a housing in which is mounted an air cylinder 17 which is connected to and vertically reciprocates the cutting punch 11.

The guide rolls 14*a* and 14*b* are supported in diametrically opposed relation across a lower portion of the housing 16 so that they can keep the adhesive tape T that symmetrically on opposite sides of the housing 16. The adhesive tape T is also guided in and along guide grooves 16*a* formed obliquely in the bottom portion of the housing 16. The grooves 16*a* are aligned with the guide rolls 14*a* and 14*b* respectively so that the adhesive tape T has a straight run therebetween. The housing 16 has a central horizontal guide surface 16*b* intermediate between the oblique guide grooves 14*a* and 14*b* and extending parallel to the plane of a slide fastener chain C travelling in the direction of the arrow.

The cutting punch 11 has a cross-sectionally round circular blade 11*a* which is peripherally recessed as at 11*b* in the form of a shallow inverted-V for purposes hereafter described.

The cutting anvil 12 is centrally provided with a bore 12*a* dimensioned to snugly receive the cutting punch 11 and has an upper surface 12*b* downwardly sloped to avoid any substantial contact with the adhesive tape T.

Designated at 18 is a support mandrel secured in a base 19 and located under and in alignment with the bore 12*a* and the punch 11. The top end of the support mandrel 18 is rounded off to provide a substantially semi-spherical head 18*a* which serves to evade direct abutting engagement with the blade 11*a* of the cutting punch 11.

Figure 4:
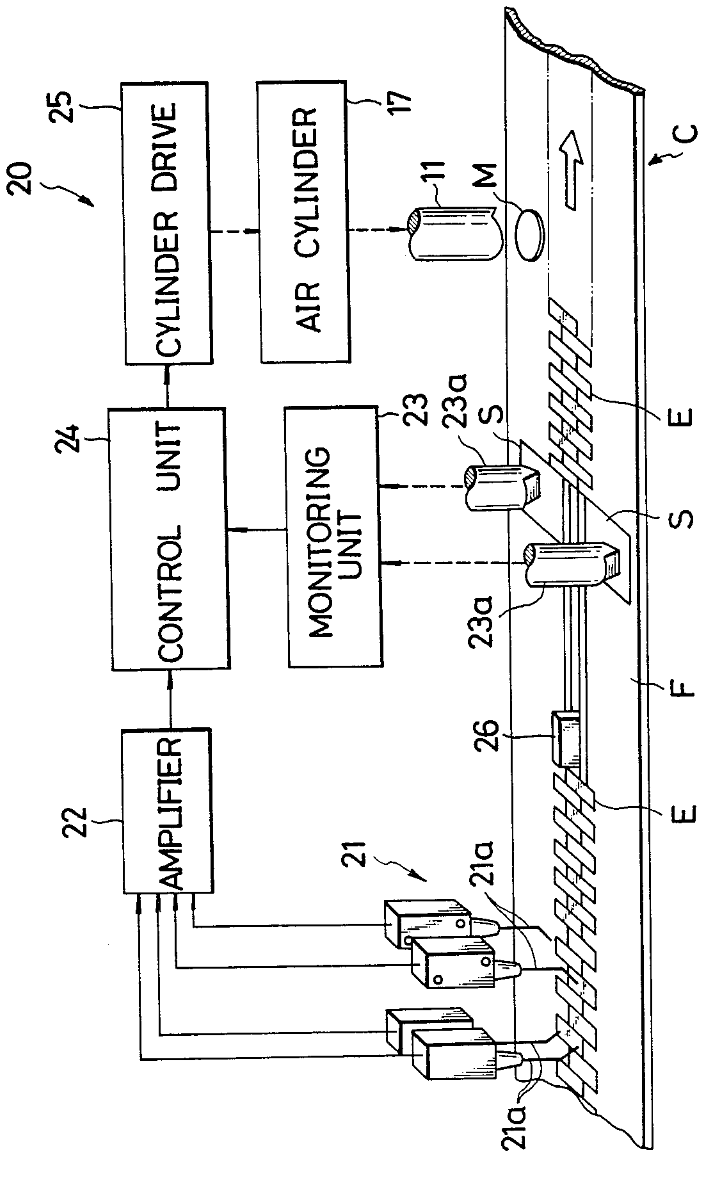
FIG. 4 is a schematic diagram showing an automatic defect detecting device operatively associated with the apparatus of the invention and a portion of a slide fastener chain on enlarged scale.

Reference to FIG. 4 shows an automatic defect detecting device generally designated as 20 which essentially comprises a pair of fastener element monitoring units 21 each including optical fibers 21*a* disposed on each of slide fastener stringers for monitoring the fastener coupling elements E on the respective support tapes of an individual slide fastener F; an amplifier unit 22; a reinforcing strip monitoring unit 23 including a detecting pin 23*a* disposed on each stringer half for monitoring a reinforcing strip S at one end of each individual slide fastener F; and a control unit 24 connected to the two monitoring units 21, 22 and adapted to actuate a cylinder drive 25 connected to the air cylinder 17.

When either of the fastener element monitoring units 21 encounters any defective or maligned fastener elements E, it generates a signal which is amplified at the unit 22 and fed to the control unit 24, whereupon the cylinder drive 25 is actuated to drive the air cylinder 17. In like manner, when the reinforcing strip monitoring unit 23 detects any defective reinforcing strip S, it sends a signal to the control unit 24, whereupon the drive 25 is turned on to actuate the air cylinder 17. Since the detecting device 20 does not form positive part of the invention, no further description as to its details will be required.

A positioning pin or stopper 26 is employed to stop the travel of the fastener chain C at predetermined intervals in a manner well known in the art.

Figure 3A:
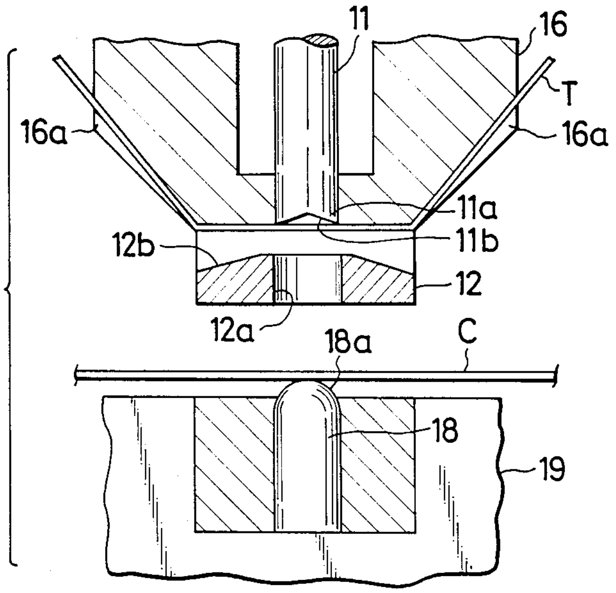
FIGS. 3A–3E, inclusive, are cross-sectional views of an operative part of the apparatus, utilized to explain the sequence of its marking operation.
Figure 3B:
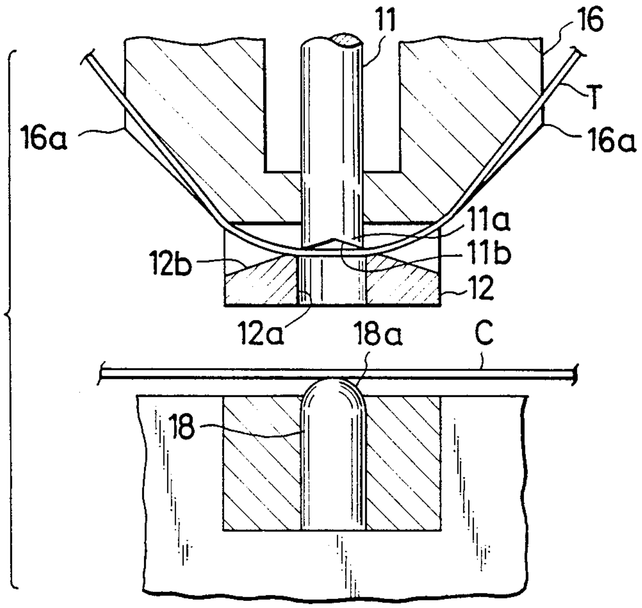
Figure 3C:
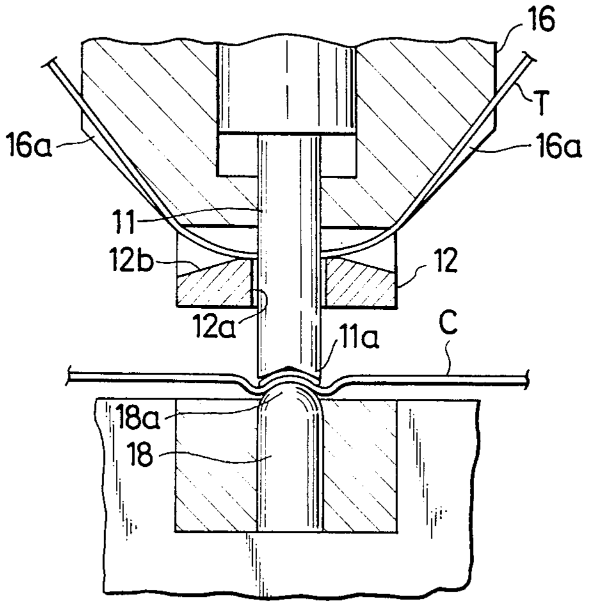
Figure 3D:
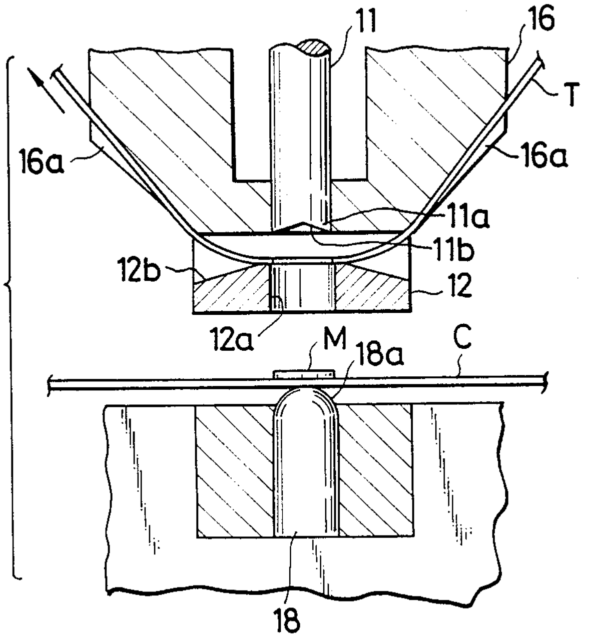
Figure 3E:
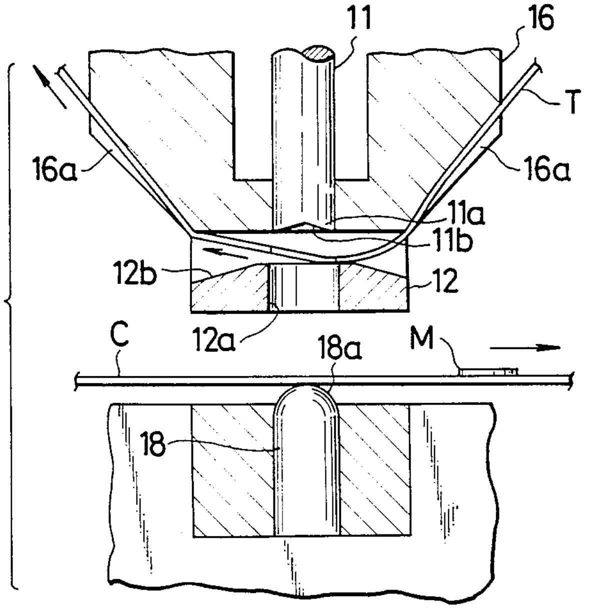

Now, as and when the fastener chain C is found defective by the detecting device 20, the air cylinder 17 makes a downward stroke to cause the cutting punch 11 to cut a piece out of the adhesive tape T and transfers the same onto either tape half of the fastener F. This operation is depicted in FIG. 3, in which FIG. 3A shows the punch 11 retracted away from the coacting anvil 12 and with its blade **11*a* immediately above the uncoated side of the adhesive tape T; FIG. 3B shows the punch 11 urging the tape T into contact with the anvil 12; FIG. 3C shows the punch 11 as having cut an indicia M; i.e., a circular piece out of the tape T and moved past the anvil 12 into abutting relation to the support mandrel 18, in which position the coated side of the indicia M is bonded to the slide fastener tape; FIG. 3D shows the punch 11** retracted to the original stand-by position of FIG. 3A, leaving the indicia M on the fastener tape; and FIG. 3E shows the adhesive tape T and the fastener chain resuming their respective intermittent movement in the direction of the arrow.

The operation of the marking apparatus 10 effects both cutting and attaching of the marking indicia M substantially simultaneously through a single one-way stroke of the cutting punch 11.

It will be understood that individual slide fasteners F severed from its continuous chain C, when marked with the indicia M, will be optically detected and further processed for the necessary corrective finish, in which instance some of such marked fasteners whose defects are negligible may be progressed as acceptable conveniently by just removing the indicia M.

Obviously, various modifications and variations of the present invention are possible in the light of the above teaching. It is therefore to be understood that within the scope of the appended claims the invention may be practiced otherwise than as specifically described.

What is claimed is:

1. A marking apparatus for identifying defective slide fasteners in a continuous slide fastener chain as the slide fastener is fed longitudinally along a horizontal path, comprising:

(a) means for detecting a defective slide fastener in the slide fastener chain;

(b) a punch operating unit actuated when a defective slide fastener is detected by said detecting means;

(c) a cutting punch driven by said punch operating unit to reciprocate along a vertical path, said cutting punch having a peripheral cutting edge;

(d) at least two guide rolls disposed on opposite sides of said vertical path of movement of said cutting punch for supporting therebetween a longitudinal portion of a continuous adhesive tape, said cutting punch when driven being operative to cut a piece out of the longitudinal portion of the adhesive tape, thereby producing an indicia indicative of a defective slide fastener; and (e) a stationary support mandrel disposed below said horizontal path of movement of the fastener chain in registry with said cutting punch for supporting said indicia between the detected defective slide fastener and said cutting punch, said support mandrel having a relieved upper surface held out of contact with said cutting edge when said indicia is supported.

2. A marking apparatus according to claim 1, including a housing vertically reciprocally supporting thereon said cutting punch and having a horizontal guide surface for supporting thereon the longitudinal portion of the adhesive tape, and a cutting anvil disposed between said cutting punch said support mandrel and having a vertical bore for the passage therethrough of said cutting punch, said cutting anvil having a downwardly sloped upper surface confronting said horizontal guide surface of said housing.

3. A marking apparatus according to claim 2, said housing having a pair of oblique guide grooves extending upwardly outwardly from opposite ends of said horizontal guide surface and disposed respectively in alignment with said guide rolls.

4. A marking apparatus according to claim 1, said cutting punch having a centrally recessed lower surface, said cutting edge being formed on an outer peripheral edge of said lower surface, said support mandrel having a substantially semi-spherical head cooperative with said recessed front surface of said cutting punch in holding therebetween the indicia and the defective slide fastener.

5. A marking apparatus according to claim 4, said cutting edge being of a circular shape and having a diametrically opposite recessed portions.

* * * * *